United States Patent [19]
Oguma

[11] 3,722,646
[45] Mar. 27, 1973

[54] APPARATUS FOR CONTROLLING THE PRESSURE OF A FLUID FED TO A CLUTCH OF A TRANSMISSION

[75] Inventor: Tomio Oguma, Saitama-ken, Japan

[73] Assignee: Honda Giken Kogyo Kabushiki Kaisha, Tokyo, Japan

[22] Filed: Mar. 12, 1971

[21] Appl. No.: 123,914

Related U.S. Application Data

[63] Continuation of Ser. No. 807,779, March 13, 1969, abandoned.

[52] U.S. Cl............192/109 F, 192/.076, 192/87.18, 137/505.14
[51] Int. Cl...............................................F16d 25/10
[58] Field of Search......192/109 F, 85 R; 137/505.14

[56] References Cited

UNITED STATES PATENTS

| | | | |
|---|---|---|---|
| 3,098,507 | 7/1963 | Froslie | 137/505.14 X |
| 3,583,422 | 6/1971 | Dach | 137/505.14 X |
| 2,720,294 | 10/1955 | Hindmarch | 192/109 F |
| 2,756,851 | 7/1956 | Collins | 192/109 F |
| 2,807,968 | 10/1957 | Forster | 192/109 F |
| 3,466,950 | 9/1969 | Mummert | 192/109 F |
| 2,720,294 | 10/1955 | Hindmark | 192/109 F X |
| 2,721,640 | 10/1955 | Feo et al. | 192/109 F |
| 2,807,968 | 10/1957 | Forster | 192/109 F X |
| 3,365,035 | 1/1968 | Kress | 192/109 F |
| 3,389,770 | 6/1968 | Golan et al. | 192/109 F X |
| 3,401,581 | 9/1968 | Chana | 192/109 F X |

*Primary Examiner*—Benjamin W. Wyche
*Attorney*—Waters, Roditi, Schwartz & Nissen

[57] ABSTRACT

A valve is interposed between a source of pressure fluid and a clutch of a transmission such that the valve initially passes the pressure fluid at a high rate to take up slack in the clutch whereafter the supply of pressure fluid to the clutch is sharply reduced during clutch engagement and subsequently gradually increased. The valve includes first and second chambers which are respectively fed with the pressure fluid being supplied to the clutch, one of the chambers being fed with delay.

2 Claims, 2 Drawing Figures

INVENTOR

BY Tomio Oguma

3,722,646

APPARATUS FOR CONTROLLING THE PRESSURE OF A FLUID FED TO A CLUTCH OF A TRANSMISSION

This application is a continuation of application Ser. No. 807,779, filed Mar. 13, 1969, and now abandoned.

BRIEF SUMMARY OF THE INVENTION

It has been known hitherto that, in a transmission apparatus for a motorcar or the like, an oil pressure operated friction engaging apparatus such as a friction clutch is operated by being supplied with a pressure fluid and thereby a corresponding predetermined change-speed ratio of the transmission system is established. It has been usual hitherto in this kind of apparatus that the supply of the pressure fluid to the friction engaging apparatus is effected at a nearly constant speed, and if, in this case, the supply speed is comparatively high, the engagement is made violently and a shock is liable to take place in the transmission system, whereas in contrast, if the supply speed is comparatively low, the shock is low, but it takes substantial time to form the friction engagement and thereby the operation is liable to be delayed.

An object of this invention is to provide an apparatus free from such defects which is characterized in that, in a transmission apparatus of the type in which an oil pressure operated friction engaging apparatus is operated by being supplied with a pressure oil and thereby a corresponding predetermined transmission system is established, the supply of the pressure oil is first made at a comparatively large speed and then is decreased. Thereby, initial slack is rapidly taken up and thereafter the friction engagement is effected without shock.

According to a feature of this invention, in the apparatus as described above, a control valve of ordinarily open type is interposed in an oil supply passage for connecting the friction engaging apparatus with a pressure oil source, and a first pressure oil operated apparatus for operating said valve to move towards its closing side and a second oil pressure operated apparatus for operating said valve to move toward its opening side are so provided that these are in communication with the outlet side of said valve through a first communicating passage and a second communicating passage, respectively, the second communicating passage being made larger in flow resistance than the first communicating passage.

According to another feature of this invention, in the apparatus as described above, a pressure oil chamber of the second oil pressure operated apparatus is larger in effective capacity than a pressure oil chamber of the first oil pressure operated apparatus.

DETAILED DESCRIPTION

Figure 1:
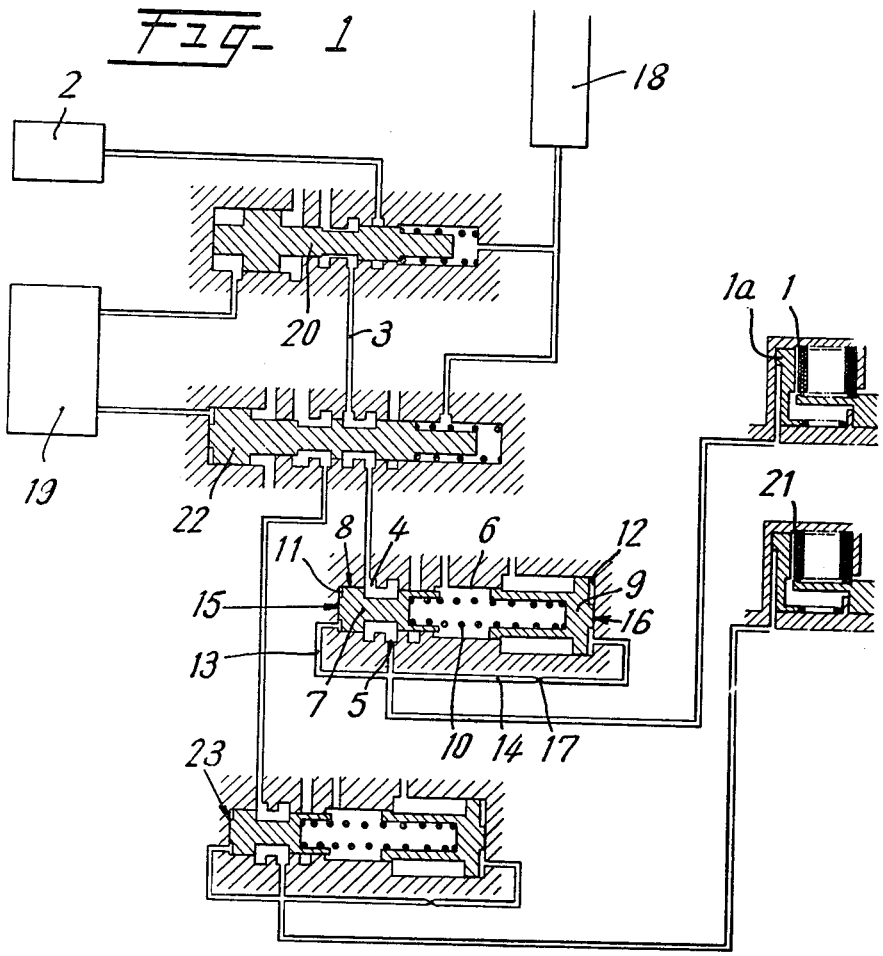
FIG. 1 is a diagrammatic illustration of one embodying example of this invention.

Referring to the drawing, numeral 1 denotes a friction clutch constituting an oil pressure operated friction engaging apparatus. The clutch 1 is incorporated in a transmission apparatus (the details of which are not illustrated) having a transmission system for first speed with a free wheel (not shown) and a transmission system for second speed (higher than first speed) which are selectively switched to assume their respective operating conditions when the clutch 1 is either operative or inoperative. A control valve 8 comprising a cylinder type valve housing 6 and a piston type slidable valve 7 contained therein, is interposed at its inlet opening 4 and outlet opening 5 in a supply oil passage 3 for connecting the friction clutch 1 with an operation pressure oil source 2 such as an oil pump. The valve housing 6 contains the slidable valve 7 at one end thereof (the left end in the drawing) and it is somewhat enlarged in diameter at its other end for receiving therein a piston 9 of large diameter. A spring 10 is interposed between the valve 7 and piston 9, so that normally the valve 7 is located at the left and full open position, that is, the position at which the inlet opening 4 is fully open. A space 11 is formed at the left end of the interior of the valve housing 6 between such end and the slidable valve 7, and a space 12 is formed at the right end thereof between this end and the piston 9. The spaces 11 and 12 are in communication with the outlet opening 5 of the valve 8 through a feedback circuit including first communicating passage 13 and a second communicating passage 14, respectively so that spaces 11 and 12 may become first and second pressure oil chambers 11 and 12, respectively. The first pressure oil chamber 11 and the valve 7 form a first oil pressure operated apparatus 15 of oil pressure piston cylinder type so that when the chamber 11 is supplied with pressure oil, the slidable valve 7 is pushed to the right in the drawing toward its closing side. The second pressure oil chamber 12 and the piston 9 form a second oil pressure operated apparatus 16 of oil pressure piston cylinder type so that when the chamber 12 is supplied with pressure oil, the piston 9 is pushed to the left in the drawing so as to compress the spring 10, whereby the slidable valve 7 is urged to the left in the drawing toward its opening side. In this case, since the piston 9 of the second pressure oil operated apparatus 16 is larger in diameter than the valve 7 of the first pressure oil operated apparatus 15, the force for closing the valve 7 by the former exceeds the force for opening the valve 7 by the latter, but as the effective capacity of the pressure oil chamber 12 thereof is larger, the former is delayed in the speed of its operation as long as the amount of the supply of pressure oil is not increased.

The second communicating passage 14 is provided in the middle thereof with an orifice 17, so that the flow resistance thereof is increased in comparison with that of the first communicating passage 13, whereby the supply of pressure oil to the second pressure oil chamber 12 is delayed in proportion thereto.

In the illustrated embodiment, there are shown a first control pressure oil source 18 for generating an oil pressure corresponding to the engine output power and a second control pressure source 19 for generating an oil pressure corresponding to the speed of revolution of an output shaft of the transmission apparatus, i.e., the car speed. A pressure difference responsive valve 20 is interposed in passage 3 and is connected at both ends to the control pressure oil sources 18 and 19 respectively so as to be automatically switched in accordance with the pressure difference between the sources 18 and 19 so that the friction clutch 1 may be switched to be either operative or inoperative by being selectively connected automatically to either the pressure oil source 2 or the air side depending on the comparative values of engine output power and car speed, whereby the change speed operation becomes automatic. In the illustrated embodiment, additionally, a second friction clutch 21 is prepared in such a manner that, by the action of a second pressure difference responsive valve 22 interposed in the oil supply passage 3, the clutch 21 may be connected in alternation with the first friction clutch 1 to the pressure oil source 2 for providing a third speed.

The second pressure difference responsive valve 22 is in communication at both ends thereof with the first and second control pressure oil sources 18 and 19 in substantially the same manner in the case of the first pressure difference responsive valve 20 so as to be automatically switched by the difference of pressure between the sources 18 and 19, but these two responsive valves 20 and 22 are distinguished from one another as regards their respective pressure receiving areas at the left ends thereof in the drawing, that is, at the sides thereof in communication with the second control pressure oil source 19, so that they are operated at different car speeds. Additionally, the second friction clutch 21 is also provided on its oil supply side with a second control valve 23 of a type similar to control valve 8 for being similarly controlled in its operation.

The operation of the apparatus according to the invention will now be explained as follows:

If, from the condition shown in FIG. 1, the first pressure difference responsive valve 20 is moved to the right whereby the supply oil passage 3 is opened, the pressure oil from the pressure source 2 is supplied at first to the friction clutch 1 through the control valve 8 which is in full, open condition. Thereby a piston 1a within the clutch 1 is advanced to take up initial play inherent in this kind of clutch. Meanwhile, part of the pressure oil is supplied to the first and second pressure oil operated apparatus 15 and 16 through the communicating passages 13 and 14 from the outlet opening 5 of the valve 8, so that the valve 8 is pushed toward its closing side by the apparatus 15 and toward its opening side by the apparatus 16, but the latter is delayed in its operation because of the fact that the communicating passage 14 thereof has increased flow passage resistance by the presence of orifice 17, and the pressure oil chamber 12 has a comparatively large effective capacity. Accordingly, the valve 8 is at first moved to the closing side by the first pressure oil operated apparatus 15 so that the supply amount of pressure oil to the friction clutch 1 is substantially decreased, whereafter the valve 8 is gradually increased in its open degree by the second pressure oil operated apparatus 16 so that the supply of pressure oil to the friction clutch 1 is gradually increased. This condition is shown by curve A in FIG. 2. Curve B in the same Figure shows the conventional case in which the rate of supply amount is constant.

Figure 2:
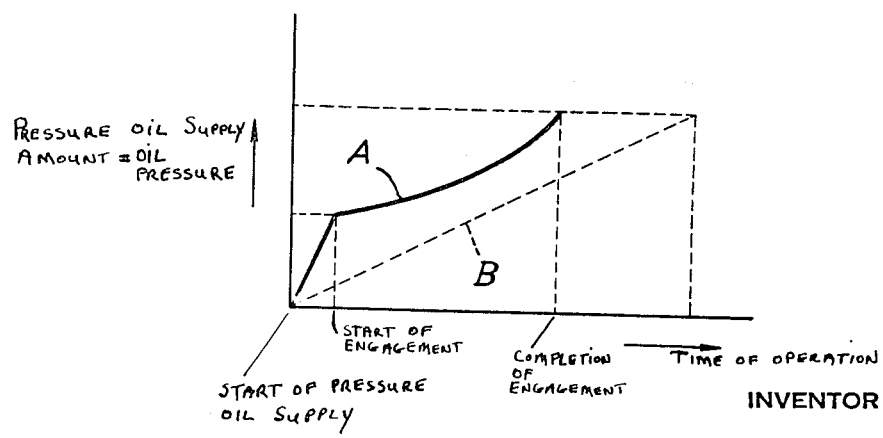
FIG. 2 is a graph showing the variation of the oil pressure in the clutch with respect to time.

Thus, according to this invention, the amount of pressure oil supplied to a friction engaging apparatus such as a friction clutch is at first large and is then decreased, so that such an operation characteristic feature as shown, for example, by the curve A of FIG. 2 can be obtained, whereby in comparison with the conventional case as shown by the curve B of the same Figure, not only is the time for finishing the operation shortened but also the upward slope of the curve A becomes comparatively low at the portion at which friction engagement is substantially obtained, so that there is effected an alleviation of the shock liable to occur at the time of the formation of the friction engagement.

The pressure in source 19 increases with the speed of the output shaft of the transmission, and at a predetermined value the valve 22 is displaced to interrupt flow to valve 8 and open a path for flow to valve 23. By an operation analogous to that in valve 8, the valve 23 supplies oil to clutch 21 at an initial high rate to take up play in the clutch whereafter the supply rate is reduced to effect smooth clutch engagement without shock. Meanwhile, the clutch 1 is released.

What is claimed is:

1. In combination, a source of pressure fluid, friction engaging apparatus adapted for connection with said source for being operated by said pressure fluid, and a valve means between said source and said friction apparatus for controlling the flow of the pressure fluid to said friction engaging apparatus to provide an initial high rate of supply of pressure fluid during which the friction engaging apparatus takes up slack followed by a reduced rate during which the friction engaging apparatus is rendered operative, said valve means comprising a valve member, an outlet passage leading from the valve member to the friction engaging apparatus and a feedback circuit connected between the outlet passage and the valve member and responsive to the fluid pressure being supplied to the friction apparatus for controlling the valve member, said valve member being initially operated to pass pressure fluid at a maximum rate, said feedback circuit including means to apply the pressure of a portion of the fluid which is supplied to the friction apparatus to said valve member to partially close the same and reduce the flow of the fluid supplied to the friction apparatus, said valve member including two individually displaceable elements which are also displaceable relative to one another, and resilient means between said displaceable elements, one of said elements regulating the flow of pressure fluid to said friction engaging apparatus and having a lesser cross-section than that of the other of said elements, said means of the feedback circuit for applying the pressure fluid to the valve member comprising first and second pressure chambers respectively communicating with said displaceable elements, and fluid passages connecting said outlet passage to the respective chambers in parallel for supply thereto of pressure fluid which is fed to the friction apparatus for urging said elements towards one another in opposition to said resilient means, and means for delaying the supply of pressure fluid to the chamber associated with the displaceable element of larger cross-section, comprising a restriction in the passage leading to the chamber associated with the displaceable element of larger cross-section, the latter chamber being enlarged with respect to the other chamber to further delay supply of pressure fluid thereto, said friction engaging apparatus having initial slack, said fluid pressure being supplied at an initial high rate to take up said slack whereafter the fluid pressure in the chamber associated with said element of smaller cross-section increases relative to the fluid pressure in the chamber associated with the element of larger cross-section whereby said element of smaller cross-section is displaced and the flow of pressure fluid to the friction engaging apparatus is reduced, the pressure of the fluid supplied to the chamber associated with the element of larger cross-section gradually increasing whereby the rate of flow of pressure fluid to said friction apparatus also gradually increases.

2. The combination as claimed in claim 1 comprising a second friction engaging apparatus and a second valve means coupled to the second friction engaging apparatus and to said source, and means between said source and the first and second valve means for supplying the same in alternation whereby the first and second friction engaging apparatus are selectively operated.

* * * * *

UNITED STATES PATENT OFFICE
CERTIFICATE OF CORRECTION

Patent No. 3,722,646　　　　　　　　　Dated March 27, 1973

Inventor(s) Tomio Oguma

It is certified that error appears in the above-identified patent and that said Letters Patent are hereby corrected as shown below:

On the cover sheet insert -- [30] Foreign Application Priority Data  March 13, 1968  Japan  15899/68  -- .

Signed and sealed this 28th day of August 1973.

(SEAL)
Attest:

EDWARD M. FLETCHER, JR.　　　　　RENE D. TEGTMEYER
Attesting Officer　　　　　　　　　Acting Commissioner of Patents